United States Patent
Keller et al.

(10) Patent No.: US 7,455,481 B1
(45) Date of Patent: Nov. 25, 2008

(54) PNEUMATIC CARRIER

(75) Inventors: Danny D. Keller, Sanger, TX (US);
Anthony I. Juarez, Denton, TX (US)

(73) Assignee: Golston Product Solutions Company, Sanger, TX (US)

( * ) Notice: Subject to any disclaimer, the term of this patent is extended or adjusted under 35 U.S.C. 154(b) by 23 days.

(21) Appl. No.: 11/371,199

(22) Filed: Mar. 8, 2006

(51) Int. Cl.
*B65G 51/06* (2006.01)

(52) U.S. Cl. .................. 406/188; 406/184; 406/186; 406/187

(58) Field of Classification Search .......... 406/184, 406/185, 186, 187, 188, 189, 190
See application file for complete search history.

(56) References Cited

U.S. PATENT DOCUMENTS

| | | | | |
|---|---|---|---|---|
| 1,195,651 A | * | 8/1916 | Burns | 406/37 |
| 1,553,869 A | * | 9/1925 | MacLaren | 406/34 |
| 1,638,047 A | * | 8/1927 | MacLaren | 406/37 |
| 3,231,218 A | | 1/1966 | Tearne | 243/34 |
| 3,593,948 A | | 7/1971 | McClellan | 243/34 |
| 3,618,874 A | * | 11/1971 | Kettering et al. | 406/34 |
| 3,756,537 A | * | 9/1973 | Freese | 406/188 |
| 4,219,290 A | * | 8/1980 | Golston | 406/186 |
| 4,465,410 A | * | 8/1984 | Vogel et al. | 406/111 |
| 4,470,730 A | | 9/1984 | Wuthrich | 406/186 |
| 4,948,303 A | | 8/1990 | Good | 406/186 |
| 5,215,412 A | * | 6/1993 | Rogoff et al. | 406/112 |
| 5,636,947 A | | 6/1997 | Valerino, Sr. et al. | 406/186 |
| 5,871,308 A | | 2/1999 | Valerino, Sr. et al. | 406/186 |
| 6,015,246 A | | 1/2000 | Yamane et al. | 406/184 |
| 6,276,877 B1 | | 8/2001 | Crawford | 406/189 |
| 6,672,807 B1 | | 1/2004 | McIntyre et al. | 406/180 |
| 6,672,808 B1 | | 1/2004 | McIntyre et al. | 406/197 |
| 2001/0056311 A1 | | 12/2001 | Valerino, Sr. | 700/214 |

* cited by examiner

*Primary Examiner*—Douglas A Hess
(74) *Attorney, Agent, or Firm*—Thompson & Gustavson, L.L.P.

(57) ABSTRACT

A carrier (10, 40, 60) is disclosed which has a device (22) that can be an audio device to deliver a message when the carrier is opened, or warn of the presence of an object in the carrier. The message delivered can be informational or an advertisement. The device (22) can deliver a visual message as by lighting LEDs, presenting a scrolling message or projection. The message can be an audio/visual message. A message, such as an advertisement, can be molded into the carrier itself.

15 Claims, 3 Drawing Sheets

PNEUMATIC CARRIER

BACKGROUND OF THE INVENTION

The transportation of items within pneumatic carriers traveling through pneumatic tubes is well known. Examples of such designs are illustrated in U.S. Pat. No. 5,636,947 to Valerino Sr. et al and U.S. Pat. No. 5,655,677 to Fratello et al.

Typically, pneumatic carriers are either of the type having two mating halves that are hinged together on one side or of the type having a solid cylinder with one or both of the ends openable. For convenience, the two design will hereinafter be referred to as side opening and end opening carriers, respectively. Normally, a latch or spring loaded detent of some type is used to hold the carrier in the closed position.

SUMMARY OF THE INVENTION

In accordance with one aspect of the present invention, a carrier is provided which has a first member and a second member. The first member can move relative the second member between a closed position and an open position. The carrier also includes an audio or video device that can be activated to present an audio or visual message, respectively. In accordance with another aspect of the present invention, movement of the first member to the open position activates the audio or visual device.

In accordance with another aspect of the present invention, the device is a video device activated to display the message continuously. The video device can include a series of LEDs. In accordance with another aspect of the present invention, the device is a video device that is activated by movement of the first member to the open position to project the message onto the carrier.

In accordance with another aspect of the present invention, the device is activated by the presence of an object within the carrier.

In accordance with another aspect of the present invention, the device is an audio device that is programmable with a selected audio message.

BRIEF DESCRIPTION OF THE DRAWINGS

For a more complete understanding of the present invention and the advantages thereof, reference is now made to the following Detailed Description taken in conjunction with the accompanying Drawings, in which.

DETAILED DESCRIPTION OF THE INVENTION

Figure 1:
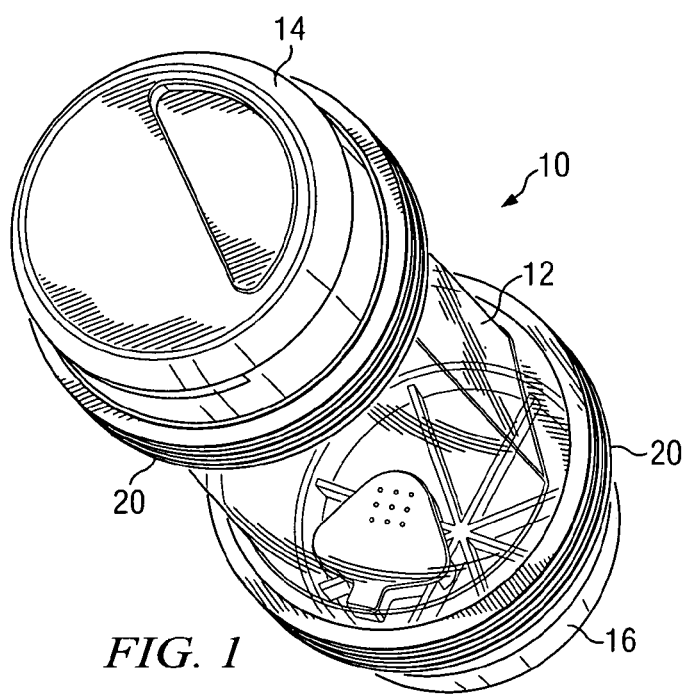
FIG. 1 is a perspective view of a carrier having openable end caps incorporating a first embodiment of the present invention, with the end caps in the closed position.
Figure 2:
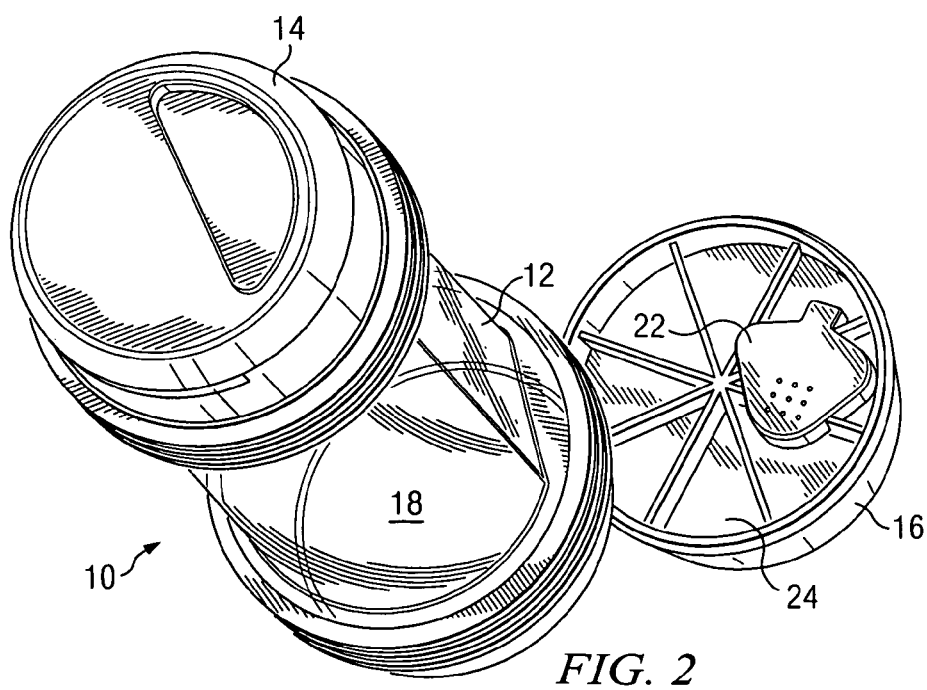
FIG. 2 is a perspective view of the carrier of FIG. 1 with an end cap opened to activate an audio device.

With reference now to the accompanying drawings, wherein like or corresponding parts are designated by the same reference numerals, there is illustrated in FIGS. 1 and 2 an end opening carrier 10 of the type used to carry items therein in a pneumatic tube system. The carrier 10 can carry medical samples, letters, objects, and the like. The carrier 10 includes a main body 12 and openable end caps 14 and 16. Each end cap 14 and 16 is pivotally mounted to the main body 12 so that the end caps can be pivoted to the open position as seen in FIG. 2 to allow access to the interior 18 of the carrier 10. The main body 12 has seals 20 near each end to seal against the interior of the tubes through which the carrier 10 travels.

Figure 3:
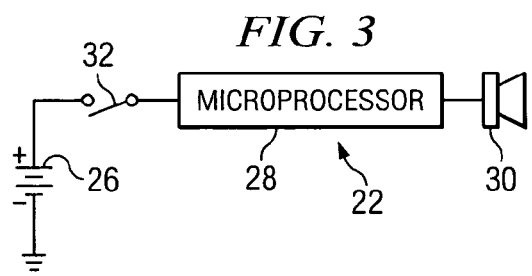
FIG. 3 is a schematic view of the audio device used in the carrier.

An audio device 22 is mounted on the inside surface 24 of end cap 16. As seen in FIG. 3, the audio device 22 includes a battery 26, switch 32, microprocessor or microcontroller 28 and speaker 30. The audio device 22 is capable of playing an audio message that is stored in the memory of the microprocessor 28. In one application, the audio device is activated to deliver the audio message when the end cap 16 is moved to the open position, as seen in FIG. 2. The audio device 22 can be activated by switch 32 that closes as the end cap 16 is moved to the open position, for example.

Any suitable message could be played by the audio device 22. For example, if the carrier 10 is used in drive through banking, the message can request the customer to take certain actions, like place a deposit slip in the carrier. The message can be an advertisement for goods or services or a jingle or song. Preferably, the microprocessor 28 is reprogrammable to enter a different message into memory for delivery. A suitable port or connector can be mounted on the microprocessor to permit downloading of a new message into the microprocessor memory. A button could be mounted on the audio device 22 that, when pushed, would allow a person to record a message into the memory of the microprocessor. With this feature, a teller at a bank, for example, could record a custom message of instructions to a customer.

The audio device 22 can also be activated by the presence of an object in the interior 18 of the carrier 10. The device 22 can have a proximity switch or other suitable sensor to detect the proximity of the object within the carrier. This would be particularly useful when the carrier 10 is used in medical facilities where the carrier 10 may be carrying fragile or hazardous tissue samples. The audio device 22 could be set to broadcast a continuous message whenever an object is in the carrier to remind users to rapidly process the object. Alternatively, the audio device 22 could have a timer that is set when the object is placed in the carrier 10 and broadcasts an audio alarm after a predetermined passage of time if the carrier is not opened and object removed. The predetermined time could represent the expected time for delivery to the destination.

Device 22, rather than outputting an audio signal, can instead output a visual signal, or a combined audio/visual signal. For example, the device 22 can have a series of LEDs mounted on the device 22, or on the main body 12, to display a design, text message or the like. The visual signal can be a scrolling message. The device 22 can project the message onto the carrier 10 with a suitable projection technique. As the carrier 10 is often made of a clear plastic, the visual message can easily been seen through the walls of the carrier even if the message is projected onto an interior wall of the carrier.

An advertising message can actually be molded into the carrier 10 itself. For example, a advertising message can be molded into the outer surface of the main body 12. The advertisement can be for the entity using the carrier, such as a bank, or simply a paid endorsement by another, such as a soft drink, snack, or candy company.

Figure 4:
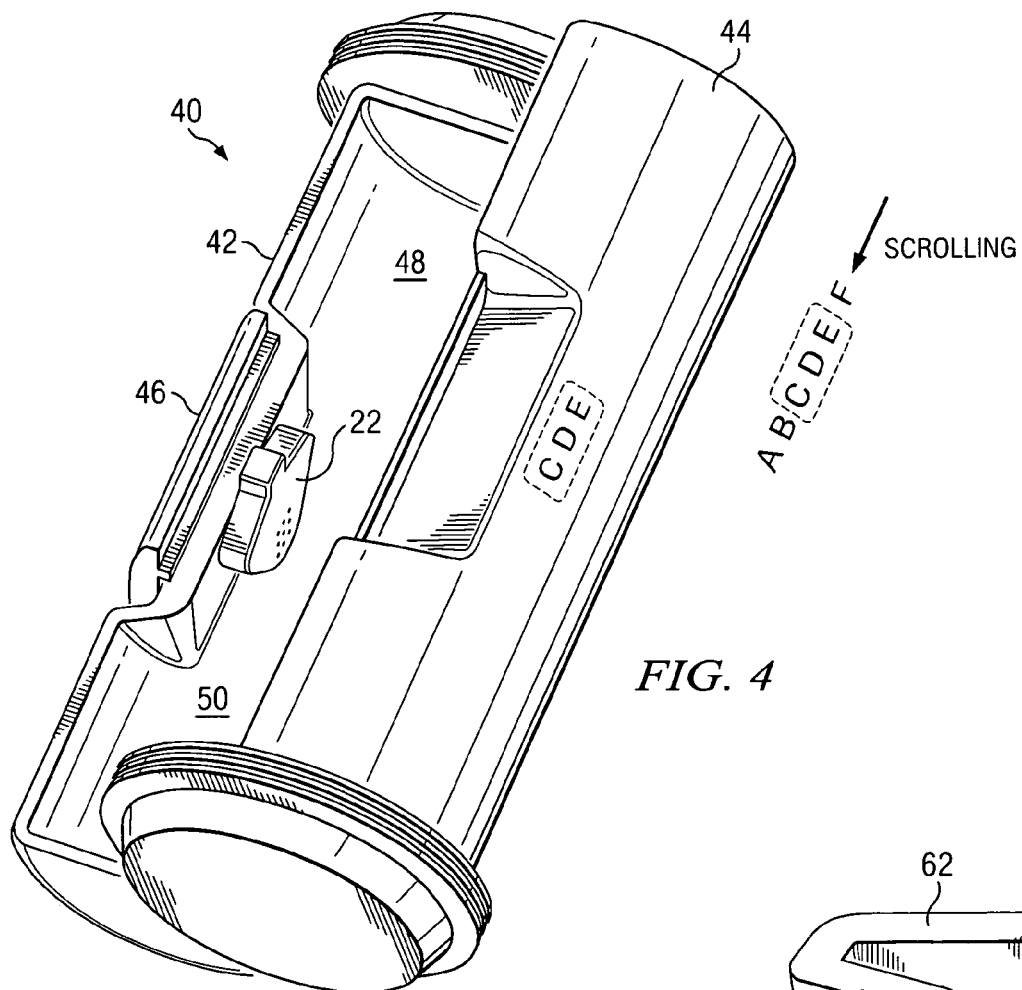
FIG. 4 is a perspective view of a side opening carrier incorporating the first embodiment of the present invention with the carrier open to activate the audio device.

FIG. 4 illustrates a side opening carrier 40 having a first half 42 and a second half 44. The halves 42 and 44 are hinged together to allow the halves of the carrier 40 to be moved between an open position, seen in FIG. 4, to insert or remove the item to be carried, and the closed position ready for transportation through a pneumatic tube. A latch assembly 46 secures the halves 42 and 44 in the closed position. An audio device 22 is mounted on the interior surface 48 of half 42 near the latch assembly 46 as shown in FIG. 4. As with carrier 10, the audio device 22 can be activated by opening the carrier 40 or by the presence of an object within the interior 50 of the carrier 40. As discussed previously, the device 22 used in carrier 40 can alternatively have a visual output or audio/visual output.

Figure 6:
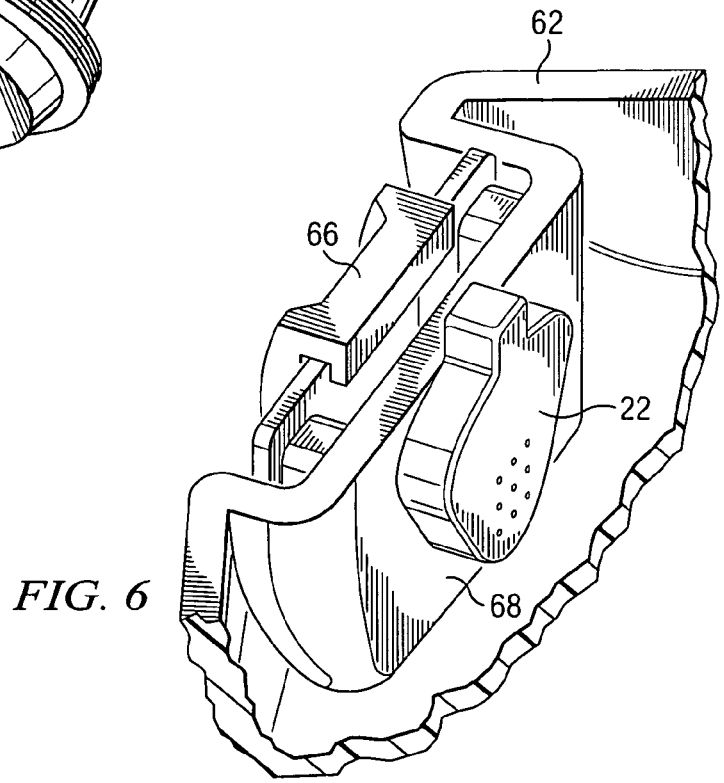
FIG. 6 is a detailed view of the carrier of FIG. 5.
Figure 5:
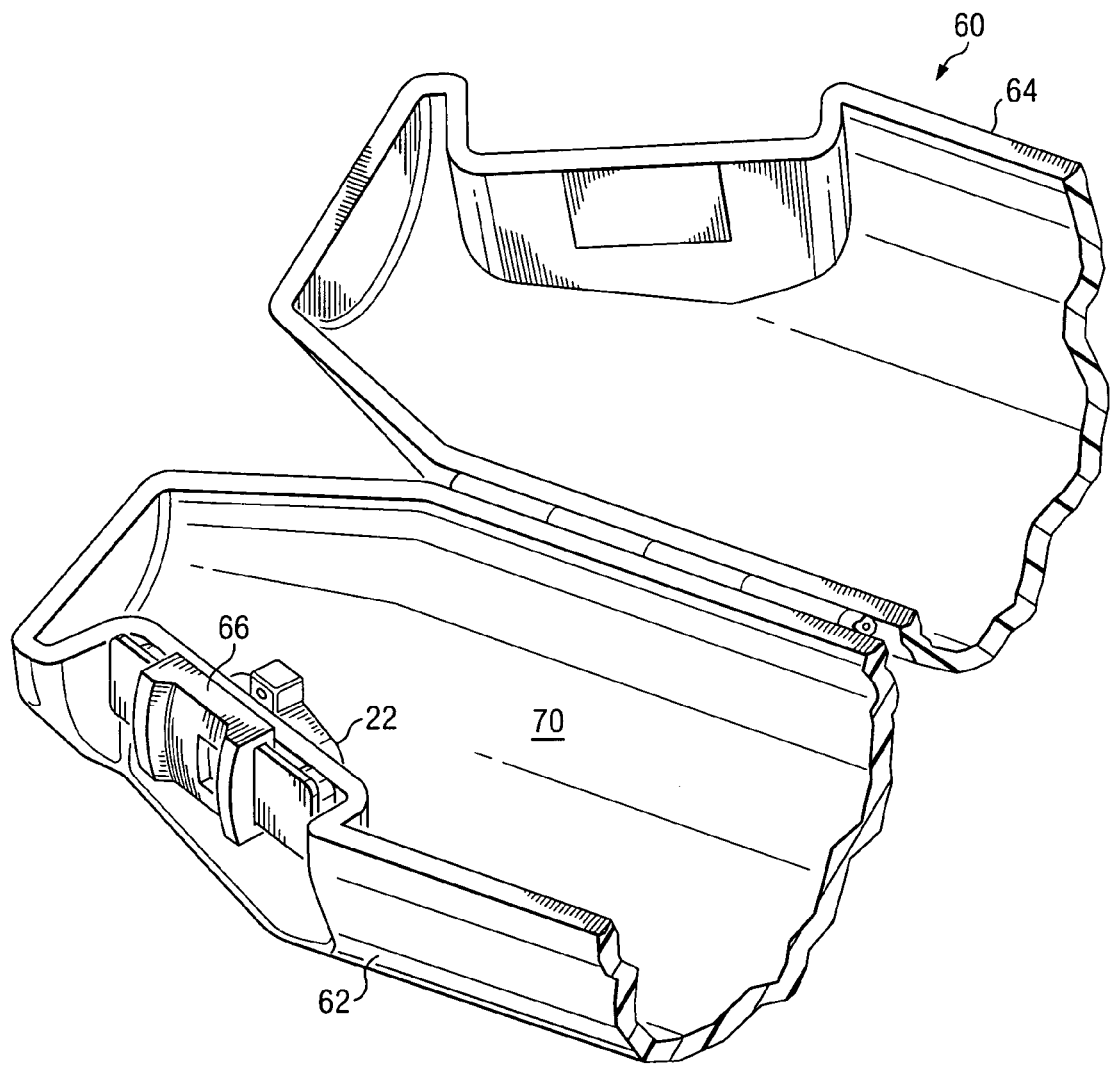
FIG. 5 is a detailed view of a modified side opening carrier showing an alternative placement of the audio device.

FIGS. 5 and 6 illustrate an alternative side opening carrier 60 having a first half 62 and a second half 64. The halves 62 and 64 are hinged together to allow the halves of the carrier 60 to be moved between an open position, seen in FIG. 5, to insert or remove the item to be carried, and the closed position ready for transportation through a pneumatic tube. Dual latch assemblies 66, one at each end of the carrier 60, secure the halves 62 and 64 in the closed position. An audio device 22 is mounted on the interior surface 68 of half 62 near one of the latch assemblies as shown in FIGS. 5 and 6. As with carrier 10, the audio device 22 can be activated by opening the carrier 60 or by the presence of an object within the interior 70 of the carrier 60. As discussed previously, the device 22 used in carrier 60 can alternatively have a visual output or audio/visual output.

Designs of carriers that can incorporate device 22 are disclosed in U.S. Pat. Nos. 5,636,947 and 5,655,677, the disclosures of which are hereby incorporated by reference in their entirety herein.

Preferably, the carriers 10, 40, and 60, and case of device 22 are molded and formed of polycarbonate, ABS, nylon, such a PA66 or PA6 nylon, or any suitable engineered plastic. Alternatively, they can be formed of a flexible metal, such as steel.

Although several embodiments of the invention have been illustrated in the accompanying drawings and described in the foregoing detailed description, it will be understood that the invention is not limited to the embodiments disclosed, but is capable of numerous rearrangements, modifications and substitutions of parts and elements without departing from the spirit and scope of the invention.

We claim:

1. A carrier for carrying an object within an interior of the carrier, the carrier comprising:
    a first member;
    a second member, the first member movable relative the second member between a closed position and an open position;
    a device mounted on the carrier to present a message upon activation of the device wherein the device is activated by movement of the first member to the open position and the object is not the message, the message emanating from the carrier, the carrier further having LEDs and wherein the device presents the message on the LEDs.

2. A carrier for carrying an object within an interior of the carrier, the carrier comprising:
    a first member;
    a second member, the first member movable relative the second member between a closed position and an open position;
    a device mounted on the carrier to present a message upon activation of the device wherein the device is activated by movement of the first member to the open position and the object is not the message, the message emanating from the carrier, wherein the device projects a visual message onto the carrier.

3. A carrier for carrying an object within an interior of the carrier, the carrier comprising:
    a first member;
    a second member, the first member movable relative the second member between a closed position and an open position;
    a device mounted on the carrier to present a message upon activation of the device wherein the device is activated by movement of the first member to the open position and the object is not the message, the message emanating from the carrier, wherein the device can be reprogrammed to deliver a different message.

4. A carrier of claim 3 wherein the device is an audio device to present an audio message upon activation.

5. A carrier of claim 3 wherein the device is a visual device to present a visual message upon activation.

6. A carrier of claim 3 wherein the carrier is an end opening carrier, the first member being an end cap and the second member being a main body.

7. A carrier of claim 3 wherein the carrier is a side opening carrier, the first member being a first side of the carrier and the second member being a second side of the carrier.

8. A carrier of claim 3 wherein the carrier is an end opening carrier, the first member being an end cap and the second member being a main body, the device being mounted on an inside surface of the end cap.

9. A carrier of claim 3 wherein the message is an advertisement.

10. A carrier for carrying an object within an interior of the carrier, the carrier comprising:
    a first member;
    a second member, the first member movable relative the second member between a closed position and an open position;
    a device mounted on the carrier to present a message upon activation of the device wherein the device is activated by movement of the first member to the open position and the object is not the message, the message emanating from the carrier, wherein the device includes a power source, a microprocessor and a speaker.

11. A carrier for carrying an object within an interior of the carrier, the carrier comprising:
    a first member;
    a second member, the first member movable relative the second member between a closed position and an open position;
    a device mounted on the carrier to present a message upon activation of the device wherein the device is activated by movement of the first member to the open position and the object is not the message, the message emanating from the carrier, wherein the carrier further has a timer to present the message only after a predetermined passage of time from activation of the device.

12. A carrier for carrying an object within an interior of the carrier, the carrier comprising:
    a first member;
    a second member, the first member movable relative the second member between a closed position and an open position;
    a device mounted on the carrier to present a message upon activation of the device wherein the device is activated by movement of the first member to the open position and the object is not the message, the message emanating from the carrier, wherein the device presents the message with no interaction with elements external the carrier.

13. A carrier for carrying an object within an interior of the carrier, the carrier comprising:
   a first member;
   a second member, the first member movable relative the second member between a closed position and an open position;
   a device mounted on the carrier to present a message upon activation of the device wherein the device is activated by movement of the first member to the open position and the object is not the message, the message emanating from the carrier, wherein the message is a scrolling message.

14. A carrier for carrying an object within an interior of the carrier, the carrier comprising:
   a first member;
   a second member, the first member movable relative the second member between a closed position and an open position;
   a device mounted on the carrier to present a message upon activation of the device wherein the device is activated upon the presence of an object within the carrier and the object is not the message, the message emanating from the carrier.

15. A carrier of claim 14 wherein the carrier further has a timer to present the message only after a predetermined passage of time from activation of the device.

* * * * *